(12) United States Patent
Petermann-Stock et al.

(10) Patent No.: US 10,427,523 B2
(45) Date of Patent: Oct. 1, 2019

(54) METHOD AND SYSTEM FOR DISPLAYING DRIVING MODES OF A VEHICLE

(71) Applicant: Volkswagen Aktiengesellschaft, Wolfsburg (DE)

(72) Inventors: Ina Petermann-Stock, Wolfsburg (DE); Ina Othersen, Bremen (DE); Agata Rogge-Solti, Munich (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 15/749,305

(22) PCT Filed: Jul. 8, 2016

(86) PCT No.: PCT/EP2016/066292
§ 371 (c)(1),
(2) Date: Jan. 31, 2018

(87) PCT Pub. No.: WO2017/021099
PCT Pub. Date: Feb. 9, 2017

(65) Prior Publication Data
US 2018/0222318 A1   Aug. 9, 2018

(30) Foreign Application Priority Data

Jul. 31, 2015  (DE) .................. 10 2015 214 685

(51) Int. Cl.
*B60K 35/00*      (2006.01)
*G01C 21/36*    (2006.01)
(Continued)

(52) U.S. Cl.
CPC ........... *B60K 35/00* (2013.01); *B60W 50/082* (2013.01); *B60W 50/14* (2013.01);
(Continued)

(58) Field of Classification Search
CPC ............ B60K 35/00; B60K 2350/1004; B60K 2350/1076; B60K 2350/2008;
(Continued)

(56) References Cited

U.S. PATENT DOCUMENTS

| 6,067,492 A | * | 5/2000 | Tabata | ..................... F16H 59/08 477/906 |
| 6,226,570 B1 | | 5/2001 | Hahn | ................................ 701/1 |

(Continued)

FOREIGN PATENT DOCUMENTS

| DE | 19743024 A1 | 4/1999 | ............... G05D 1/02 |
| DE | 20180024 U1 | 11/2001 | ............... G09G 5/00 |

(Continued)

OTHER PUBLICATIONS

International Search Report and Written Opinion, Application No. PCT/EP2016/066292, 9 pages, dated Nov. 14, 2016.

*Primary Examiner* — Joseph H Feild
*Assistant Examiner* — Rufus C Point
(74) *Attorney, Agent, or Firm* — Slayden Grubert Beard PLLC

(57) ABSTRACT

The invention relates to a method for displaying driving modes of a vehicle (6). The vehicle (6) can be operated in at least two different driving modes. In the method according to the invention, it is ascertained whether the vehicle (6) is being operated in a first or a second driving mode. In the first driving mode, a first actuator carries out a first action, and in the second driving mode, a second actuator carries out the first action. A first graphical element (7) which represents the first actuator and a second graphical element (8) which represents the second actuator are generated on a display surface (3). Depending on whether the vehicle (6) is in the first or the second driving mode, a first graphical action element (9, 10) which represents the first action is generated with the first (7) and/or second graphical element (8). The
(Continued)

invention further relates to a system (1) for displaying driving modes of a vehicle (6).

18 Claims, 7 Drawing Sheets

(51) Int. Cl.
  *B60W 50/08* (2012.01)
  *B60W 50/14* (2012.01)
  *B60W 50/00* (2006.01)

(52) U.S. Cl.
  CPC .. *G01C 21/3697* (2013.01); *B60K 2350/1004* (2013.01); *B60K 2350/1076* (2013.01); *B60K 2350/2008* (2013.01); *B60K 2350/2026* (2013.01); *B60K 2350/965* (2013.01); *B60W 2050/0072* (2013.01); *B60W 2050/146* (2013.01)

(58) Field of Classification Search
  CPC ..... B60K 2350/2026; B60K 2350/965; B60W 2050/0072; B60W 2050/146; B60W 50/082; B60W 50/14; G01C 21/3697
  See application file for complete search history.

(56) References Cited

U.S. PATENT DOCUMENTS

| | | | |
|---|---|---|---|
| 7,091,839 B2 * | 8/2006 | Situ | B60K 37/02 340/438 |
| 7,327,241 B2 * | 2/2008 | Toda | F16H 63/42 340/438 |
| 7,747,370 B2 * | 6/2010 | Dix | G01C 21/00 701/23 |
| 8,269,726 B2 | 9/2012 | Prados | 345/173 |
| 8,330,713 B2 | 12/2012 | Stelandre et al. | 345/111 |
| 9,007,199 B2 * | 4/2015 | Yamada | G07C 5/00 340/438 |
| 9,174,642 B2 | 11/2015 | Wimmer et al. | |
| 9,446,771 B2 * | 9/2016 | Yamada | G07C 5/00 |
| 9,567,008 B2 | 2/2017 | Eichhorn | |
| 9,683,875 B2 * | 6/2017 | Hackenberg | B60K 35/00 |
| 9,694,808 B2 * | 7/2017 | Weiss | B60W 30/18054 |
| 2003/0023351 A1 * | 1/2003 | Fukui | B60K 35/00 701/1 |
| 2003/0168271 A1 * | 9/2003 | Massen | B60K 31/0008 180/167 |
| 2006/0220810 A1 * | 10/2006 | Toda | F16H 63/42 340/438 |
| 2006/0287826 A1 * | 12/2006 | Shimizu | B60K 35/00 701/431 |
| 2008/0249692 A1 * | 10/2008 | Dix | A01B 69/008 701/50 |
| 2010/0052888 A1 | 3/2010 | Crowe et al. | 340/461 |
| 2010/0057281 A1 * | 3/2010 | Lawyer | G01D 7/02 701/22 |
| 2010/0262347 A1 * | 10/2010 | Murota | B60K 23/04 701/69 |
| 2011/0037582 A1 * | 2/2011 | Wu | B60K 37/02 340/438 |
| 2011/0248946 A1 | 10/2011 | Michaelis et al. | 345/174 |
| 2011/0260887 A1 * | 10/2011 | Toledo | B62D 15/0285 340/932.2 |
| 2012/0185135 A1 * | 7/2012 | Sheriff | B60W 50/082 701/48 |
| 2014/0088814 A1 | 3/2014 | You et al. | 701/23 |
| 2014/0149909 A1 * | 5/2014 | Montes | B60K 35/00 715/771 |
| 2014/0210608 A1 * | 7/2014 | Yamada | G07C 5/00 340/459 |
| 2015/0239454 A1 * | 8/2015 | Sujan | F02D 41/1401 701/54 |
| 2015/0291032 A1 * | 10/2015 | Kim | B60K 37/06 701/36 |
| 2016/0144856 A1 * | 5/2016 | Kim | B60W 50/082 701/36 |
| 2016/0185351 A1 * | 6/2016 | Jerger | B60W 50/12 |
| 2016/0257303 A1 * | 9/2016 | Lavoie | B60W 30/06 |
| 2016/0264137 A1 * | 9/2016 | Lavoie | B60T 7/22 |
| 2016/0314752 A1 * | 10/2016 | Nakano | B60K 35/00 |
| 2017/0136878 A1 | 5/2017 | Frank et al. | 345/619 |
| 2018/0222491 A1 * | 8/2018 | Miyahara | B60K 35/00 |

FOREIGN PATENT DOCUMENTS

| | | | |
|---|---|---|---|
| DE | 10324580 A1 | 12/2004 | B60R 11/02 |
| DE | 102006012147 A1 | 3/2007 | G06F 3/00 |
| DE | 102006047893 A1 | 6/2007 | G06F 3/00 |
| DE | 102008040755 A1 | 2/2010 | B60R 16/02 |
| DE | 102009060391 A1 | 6/2011 | B60K 35/00 |
| DE | 102010012247 A1 | 9/2011 | G01B 7/00 |
| DE | 102011016391 A1 | 12/2011 | G06F 3/033 |
| DE | 102010047778 A1 | 4/2012 | B60R 16/02 |
| DE | 102012002306 A1 | 8/2013 | B60R 16/02 |
| DE | 102013208206 A1 | 11/2014 | B60K 35/00 |
| DE | 102013018966 A1 | 5/2015 | B60R 16/02 |
| DE | 102014009985 A1 | 1/2016 | B60W 50/14 |
| EP | 2159098 A1 | 3/2010 | B60K 35/00 |
| EP | 2026174 B1 | 10/2010 | G06F 3/041 |
| FR | 2953304 A1 | 6/2011 | G06F 3/041 |
| JP | 2005216110 A | 8/2005 | B60R 16/02 |
| WO | 2016/000814 A1 | 1/2016 | B60W 50/14 |
| WO | 2017/021099 A1 | 2/2017 | B60K 35/00 |

* cited by examiner

METHOD AND SYSTEM FOR DISPLAYING DRIVING MODES OF A VEHICLE

CROSS-REFERENCE TO RELATED APPLICATIONS

This application is a U.S. National Stage Application of International Application No. PCT/EP2016/066292 filed Jul. 8, 2016, which designates the United States of America, and claims priority to DE Application No. 10 2015 214 685.5 filed Jul. 31, 2015, the contents of which applications are hereby incorporated by reference in their entirety.

TECHNICAL FIELD

The invention relates to a method and a system for displaying driving modes of a vehicle, wherein the vehicle can be operated in at least two different driving modes.

Due to the development of automatic driving in a vehicle, the driver is confronted with different levels of automation in the vehicle. The levels of automation in this case comprise manual driving, in which the driver undertakes the entire vehicle guidance himself, partially automatic driving in which the driver is partially assisted by the vehicle in which, whilst the vehicle undertakes the vehicle guidance, the driver is not released from monitoring the vehicle guidance, and highly automatic driving in which the driver passes all driving responsibility to the vehicle. The highly automatic driving mode in this case also comprises a fully automatic driving mode. The level of automation which is available may depend on the route to be traveled. If a plurality of levels of automation are possible, the driver himself is able to select which level of automation he uses for guiding the vehicle.

BACKGROUND

DE 10 2013 208 206 A1 discloses a device for indicating upcoming automatically performed steering interventions in a vehicle. In this case, a plurality of lighting elements which are positioned adjacent to one another in the steering wheel are activated according to information about upcoming steering interventions.

Moreover, DE 10 2012 002 306 A1 discloses a driver assistance apparatus which is designed to guide a motor vehicle automatically during a journey. To this end, it is possible to switch between a plurality of assistance modes. The assistance modes in this case comprise the spectrum from manual driving via partial automation and high automation to full autonomy of the vehicle. In this case a different control element is used for each assistance mode.

A drawback here, however, is that the driver is not able to identify clearly in which mode he has to undertake which tasks himself.

SUMMARY

It is, therefore, an object of the present invention to provide a method and a system in which the driver is able to identify intuitively and in a simple manner the tasks which he has to undertake.

According to the invention, this object is solved by a method having the features of the independent method claim and by a system having the features of the independent system claim. Embodiments and developments are disclosed in the dependent claims and in the following specification.

BRIEF DESCRIPTION OF THE DRAWINGS

The invention will now be explained in detail on the basis of exemplary embodiment with reference to the drawings, wherein.

DETAILED DESCRIPTION OF EMBODIMENTS

Figure 1:
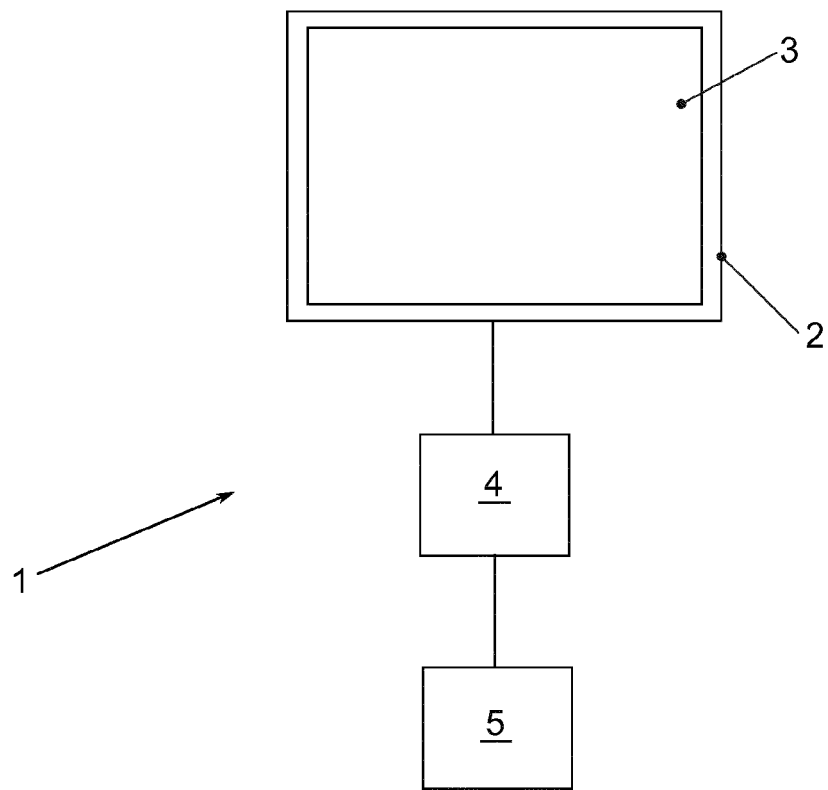
FIG. 1 shows an exemplary embodiment of a system according to the invention.

In a method according to a first aspect of the invention, it is ascertained whether the vehicle is being operated in a first or a second driving mode, wherein in the first driving mode a first actuator carries out a first action and in the second driving mode a second actuator carries out the first action. In this aspect, a first graphical element, which represents the first actuator and a second graphical element, which represents the second actuator are generated on a display surface. Depending on whether the vehicle is in the first or the second driving mode, a first graphical action element, which represents the first action is generated with the first and/or second graphical element.

According to this aspect and depending on whether an action element is actually displayed with one of the two graphical elements, it is provided in a simple manner which actuator is currently carrying out the action.

Within the context of the present explanation, "with the first and/or second graphical element" is understood that the action element may be clearly assigned visually to one of the two graphical elements. If the first and the second graphical elements, for example, are displayed below one another, the action element is displayed adjacent to the graphical element which represents the actuator which carries out the action. If the first and the second graphical elements, for example, are displayed adjacent to one another, the action element is displayed below the graphical element which represents the actuator which is carrying out the action.

According to the present aspect, a high degree of flexibility is provided for displaying the different driving modes. As different actuators are displayed, an action which has been carried out may be assigned in a flexible manner to an actuator and displayed therewith. As a result, the driver is able to detect intuitively, which tasks he is responsible for in the current driving mode and which tasks, for example, the vehicle undertakes itself.

In one embodiment of the method according to the present aspect, at least one second action is carried out by the first or the second actuator, wherein depending on the ascertainment as to whether the vehicle is in the first or the second driving mode, a second graphical action element which represents the second action is generated with the first and/or second graphical element. This embodiment permits that the display is still designed intuitively and in a simple manner, even in the case of more than one possible action which may be carried out by each actuator. A visualization of all potential configurations between the actuators and the actions is possible. Therefore, it is no longer necessary to use a separate symbol for each individual configuration, the meaning thereof potentially not being clear to the driver. Instead, by a limited number of graphical elements, wherein the driver is able to identify each individual graphical element in a simple manner, a plurality of possible configurations is covered.

Additionally, the first actuator in a corresponding embodiment may be a system for the automatic control of the vehicle and/or the second actuator may be the driver of the vehicle. In the first driving mode, the driver thus drives the vehicle manually himself whilst in a highly automatic driving mode, the vehicle is guided and monitored by a system of the vehicle. The system for automatic control in this case may comprise, e.g., all driver assistance systems which are related to automated driving. These driver assistance systems, for example, may comprise a lane keeping system, an automatic distance regulator, a speed regulator, etc. Hereinafter, when the vehicle is denoted as an actuator it is understood that the system for automatic control carries out the actions.

In one embodiment, the first action comprises a monitoring of the vehicle and/or the second action comprises a vehicle guidance of the vehicle. These potential actions form general subgroups of actions which are to be carried out when guiding a vehicle. The vehicle guidance may be subdivided into further sub-actions, such as for example steering, braking, and accelerating. The monitoring in turn may be subdivided into further sub-actions, such as for example traffic monitoring and monitoring of vehicle guidance, in particular monitoring of the traveled speed.

In corresponding embodiments, in the first driving mode, the second actuator carries out the first and the second action. In the second driving mode, the first actuator carries out the first and the second action. In a third driving mode, the first actuator carries out the second action and the second actuator carries out the first action. The driving modes in this embodiment are thus characterized by the different configurations of the actuators with the actions.

In corresponding embodiments, in the first driving mode, the vehicle is guided manually, in the second driving mode, the vehicle is guided highly automatically, and/or in the third driving mode, the vehicle is guided partially automatically. The different driving modes, therefore, denote the different levels of automation, which are possible in a vehicle. By the display of the different action elements with the graphical elements, these action elements may be displayed in a simple manner.

In a further embodiment, it is ascertained in which driving mode the vehicle is operated. If it is ascertained that the vehicle is in the first driving mode, the first and the second graphical action elements are generated with the second graphical element. If it is ascertained that the vehicle is in the second driving mode, the first and the second graphical action elements are generated with the first graphical element. If it is ascertained that the vehicle is in the third driving mode, the first action element is generated with the second graphical element and the second action element is generated with the first graphical element. As a result, the concept for the display of the levels of automation may be embodied in a highly flexible manner.

In a further embodiment, it is ascertained in which driving mode the vehicle is in. Irrespective of which driving mode the vehicle is in, the first and the second graphical action elements are generated with the first and with the second graphical element. If it is ascertained that the vehicle is in the first driving mode, the first and the second action elements are displayed highlighted with the second graphical element. If it is ascertained that the vehicle is in the second driving mode, the first and the second action elements are displayed highlighted with the first graphical element. If it is ascertained that the vehicle is in the third driving mode, the first action element is displayed highlighted with the second graphical element and the second action element is displayed highlighted with the first graphical element. In this embodiment, it is displayed to the driver that both actuators are configured to carry out both actions. Here, the action elements may be displayed highlighted by being displayed enlarged in comparison with the non-highlighted action elements. Alternatively, the non-highlighted action elements may be displayed grayed-out so that the other action elements appear highlighted. Additionally, a color coding of the action elements is also conceivable in corresponding embodiments, in which the highlighted action elements are displayed in a specific color. Moreover, the action elements may also be colored, according to which actuator has generated said action elements.

The action elements in the first actuator may in corresponding embodiments be colored, for example, yellow, orange or red, and the action elements in the second actuator may be colored, for example, green, blue or turquoise.

In another embodiment, if it is ascertained that the vehicle is in the first driving mode, the second graphical element is displayed highlighted. If, however, it is ascertained that the vehicle is in the second driving mode, the first graphical element is displayed highlighted. If it is ascertained that the vehicle is in the third driving mode, the first and the second graphical elements are displayed highlighted. As a result, it may be displayed to the driver in a simple manner which actuator is currently active. In this case, the highlighting of the first or, respectively, the second graphical element may be carried out in the same manner as the highlighting of the action elements.

In a further embodiment of the method according to the current aspect, a time is ascertained after which the vehicle changes from the ascertained driving mode to a different driving mode. In this embodiment, this time interval may also be transmitted from an apparatus of the vehicle. During the changeover, the first and/or the second action may be transferred from the first or second actuator to the respective other actuator. A direction-indicating graphical element is generated which points from the first and/or second action element with the first and/or second graphical element to the respective other first and/or second action element with the second or, respectively, the first graphical element. The ascertained time is then displayed with the direction-indicating element. This embodiment describes a highly automatic driving mode in which the driver generally does not have to monitor the system permanently. The driver has sufficient time in reserve in order potentially to take over the vehicle guidance. In contrast thereto, the driver in the second driving mode does not have to undertake either of the two actions at a defined time. For example, it may be necessary to take over the vehicle guidance on specific routes or sections of route. Thus, for example, automatic lane keeping is then no longer possible for the system when road markings are absent. The driver then has to undertake the vehicle guidance himself.

Moreover, in the third driving mode, an indicator may be emitted/shown which displays which action has to be carried out by the second actuator. As a result, it is made clear to the driver immediately which of the two actions he has to carry out himself.

Additionally and in a corresponding embodiment, a warning may be emitted before an imminent change from the second or third driving mode into the first driving mode, which indicates which action has to be undertaken by the second actuator. The warning is displayed, e.g., for a specific time interval before the changeover. As a result, the driver may readily be prepared to undertake the vehicle guidance and/or the monitoring again himself. This may make it possible to prevent the driver from being surprised by such a changeover.

A further aspect relates to a system for displaying driving modes of a vehicle, wherein the vehicle is able to be operated in at least two different driving modes. The system comprises an ascertainment unit by means of which it can be ascertained whether the vehicle is operated in the first or the second driving mode, wherein in the first driving mode a first action is able to be carried out by means of a first actuator and in the second driving mode the first action is able to be carried out by means of a second actuator. Additionally and in a corresponding embodiment, the system may comprise a display surface on which a first graphical element, which represents the first actuator, may generated and a second graphical element, which represents the second actuator may be generated. Moreover, the system comprises a control unit, which is configured to generate a first graphical action element, which represents the first action with the first and/or second graphical element on the display surface. depending on the ascertainment as to whether the vehicle is in the first or the second driving mode. The system is designed, in particular, to carry out the method according to the first aspect. The system, therefore, has all of the advantages of the method according to first aspect.

The display surface in one embodiment may be arranged, e.g., in or on the windshield of the vehicle. The display surface may for example be a so-called head-up display. The driver then does not have to divert his view from the road in order to look at the display on the display surface. Alternatively, however, the display surface may also be arranged in the central console of the vehicle or in the combination instrument of the vehicle.

The invention further relates to a vehicle having such a system.

The invention is now explained by means of further exemplary embodiments with reference to the drawings.

Figure 2:
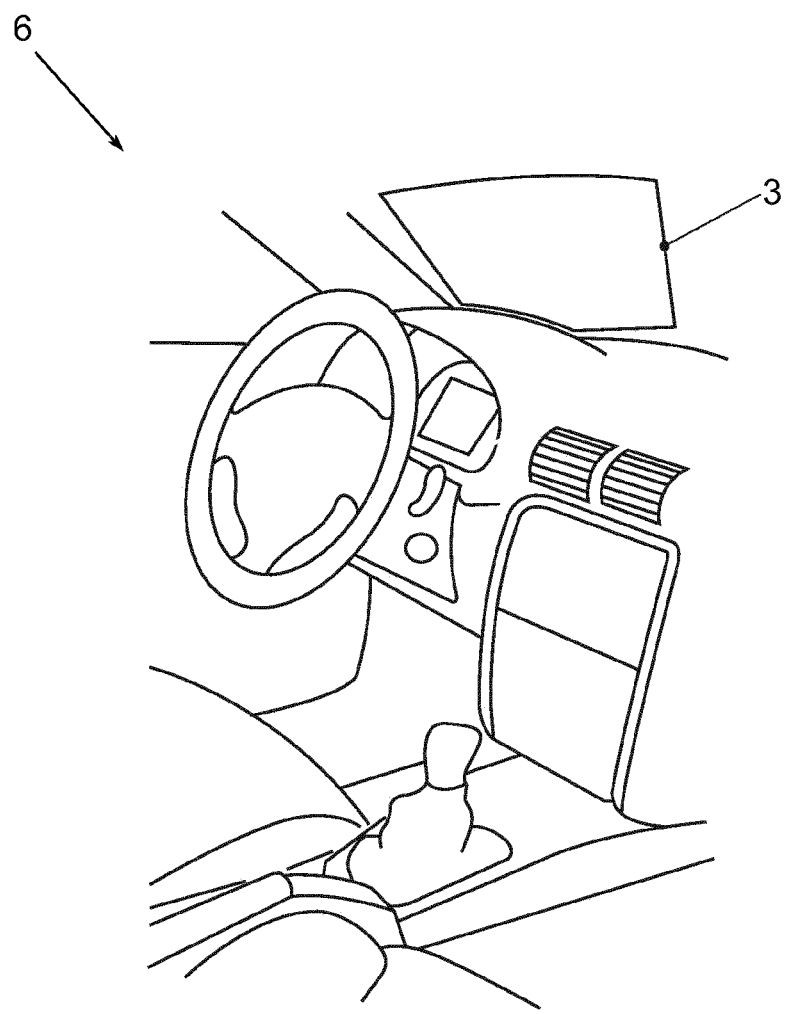
FIG. 2 shows an example of an arrangement of the system according to the invention in a vehicle.

An exemplary embodiment of a system 1 and an arrangement of the system 1 in a vehicle 6 is explained hereinafter with reference to FIGS. 1 and 2.

The system 1 according to the present embodiment comprises a display device 2 with a display surface 3. The display device 2 is coupled to a control unit 4 which in turn is coupled to an ascertainment unit 5.

By means of the ascertainment unit 5, it is possible to determine in which driving mode the vehicle 6 is operated.

The driving modes in which the vehicle 6 may be operated relate in this case to a level of automation which the vehicle 6 may adopt. The level of automation is characterized by which actions are carried out by which actuator. The actuators in this example may be, in particular, the driver of the vehicle 6 or a system of the vehicle 6 for automated driving. Such a system comprises, e.g., all driver assistance systems which are used in partially automated driving or highly automated driving. Such driver assistance systems are, for example, a lane keeping system, an automatic distance regulator, a speed regulator, etc.

The actions which are carried out in automated driving are vehicle guidance or monitoring. The monitoring in turn comprises traffic monitoring and the monitoring of the vehicle guidance itself.

In the present example, the vehicle 6 may be operated in three different driving modes. The first driving mode describes manual driving in which a driver guides and monitors the vehicle 6 himself. The second driving mode describes highly automatic driving in which the vehicle 6 itself undertakes the guidance and monitoring. An intervention of the driver in the highly automatic driving mode is not necessary at any time. The third driving mode describes a partially automatic driving mode in which the vehicle 6 undertakes the vehicle guidance and the task of monitoring is the responsibility of the driver. In the partially automatic driving mode an intervention of the driver is possible or, respectively, even necessary in the case of the respective actions of vehicle guidance and monitoring. If the ascertainment unit 5 has ascertained in which driving mode the vehicle 6 is operated, therefore, it may be established which actuator carries out which action.

This information is forwarded to the control unit 4. The control unit 4 controls the display surface 3 such that a graphical element is generated for each actuator. Additionally, depending on which actuator carries out an action, a graphical action element is generated with the corresponding actuator.

The display surface 3 is arranged in the windshield of the vehicle 6. The display surface 3 is, therefore, part of a so-called head-up display. Alternatively, the display surface 3 may also be arranged in the central console of the vehicle 6 or in the combination instrument of the vehicle 6.

Figure 3A:
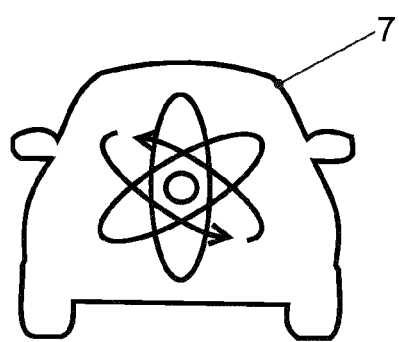
FIGS. 3a and 3b show examples of the design of graphical elements which represent the actuators.
Figure 3B:
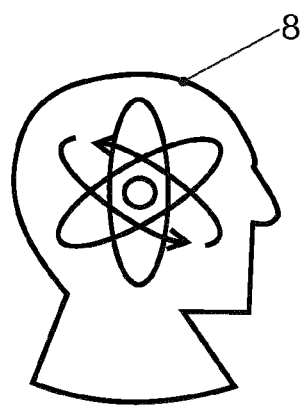

With reference to FIGS. 3a and 3b, examples of embodiments of the graphical elements 7 and 8, which represent the actuators are shown. The first graphical element 7 shown in FIG. 3a schematically displays a vehicle. As a result, it is easy for the driver to assign the first graphical element 7 to the vehicle 6 as the actuator. The second graphical element 8 schematically displays a head. As a result, it is easy for the driver to assign the second graphical element 8 to a person and, since he drives the vehicle 6, to himself as the actuator.

Figure 3C:
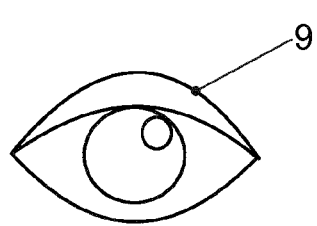
FIGS. 3c and 3d show examples of the design of graphical action elements.
Figure 3D:
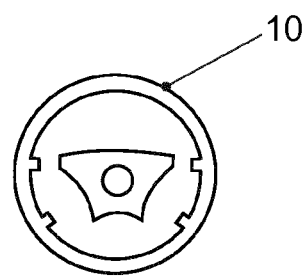

With reference to FIGS. 3c and 3d, examples of embodiments of the graphical action elements 9 and 10 which display the actions that may be carried out by the actuators are displayed. The first graphical action element 9 in this case schematically displays an eye. As a result, it is easy for the driver to assign the first graphical element 9 to the action "monitoring". The second graphical element 10 schematically displays a steering wheel. As a result, it is easy for the driver to assign the second graphical action element 10 to the action "vehicle guidance".

Figure 4A:
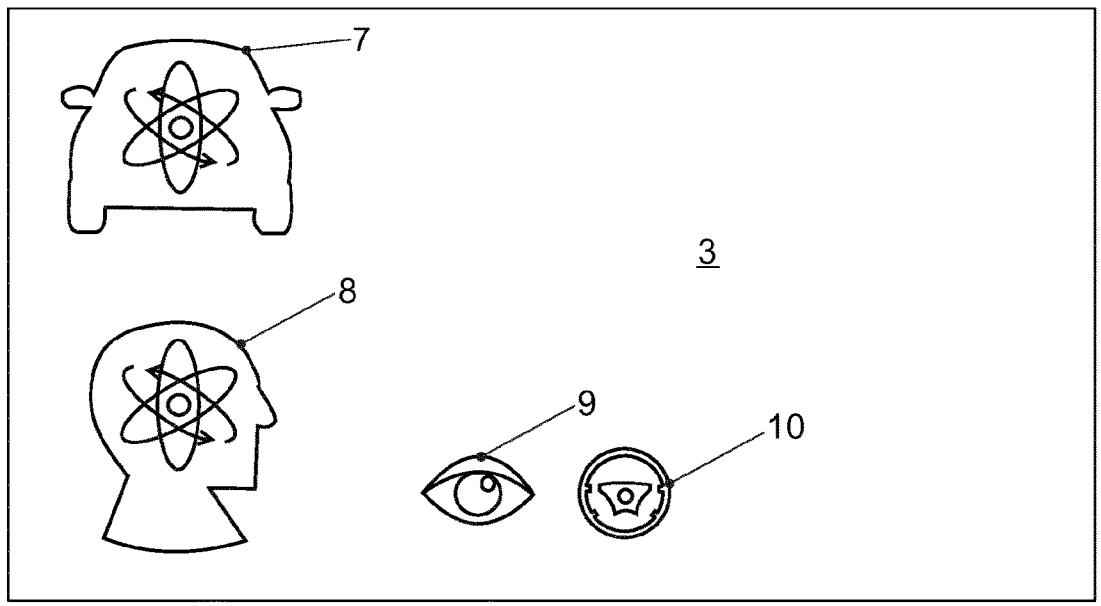
FIGS. 4a and 4b show displays as generated by a first exemplary embodiment of the method according to the invention on a display surface.
Figure 4B:
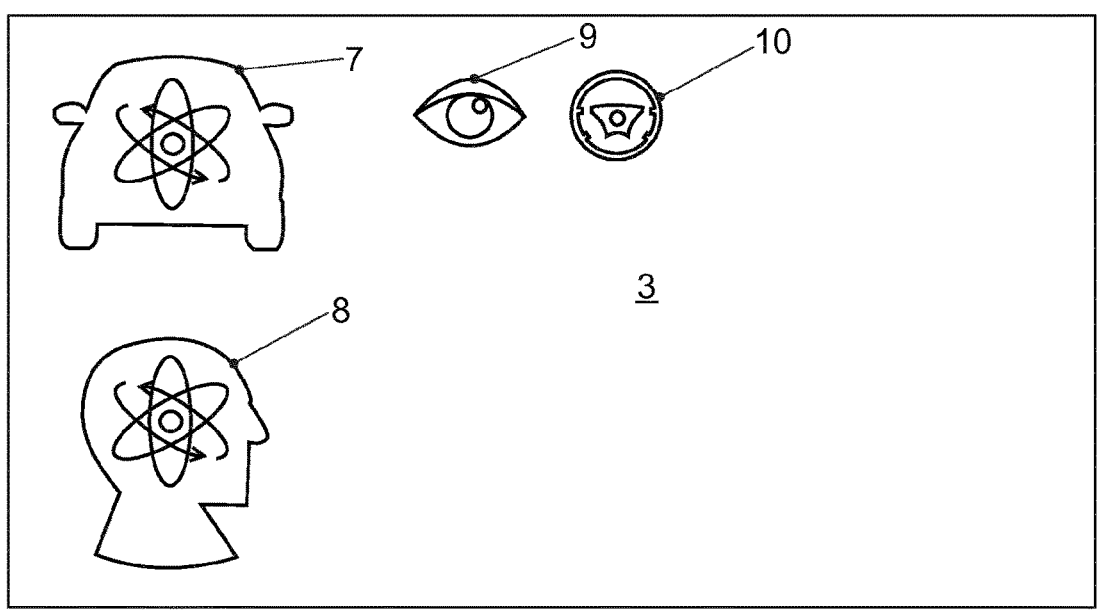

With reference to FIGS. 4a and 4b, a first exemplary embodiment of the method according to the first aspect is described.

The starting point here is that the driver starts a journey.

After the driver has started the engine, it is ascertained in which driving mode the vehicle 6 is operated. This may be preset or manually set by the driver at the start of the journey.

Additionally, the first graphical element 7 which displays the vehicle 6 as the actuator and the second graphical element 8 which displays the driver as the actuator are shown below one another on the display surface 3. The first graphical element 7 in this case is arranged above the second graphical element 8. Alternatively, the second graphical element 8 may also be arranged above the first graphical element 7.

If it is ascertained that the vehicle 6 is operated in the first driving mode, i.e., the manual driving mode, a display is generated on the display surface 3, as shown in FIG. 4a. In the first driving mode, the driver carries out both the vehicle guidance and the monitoring himself. The first action element 9 which represents the action "monitoring" and the second action element 10 which represents the action "vehicle guidance" are therefore displayed with the second graphical element 8. In the present case "with" is understood as adjacent to the second graphical element 8. As a result, the driver is able to detect immediately by looking at the display surface 3 that he has to carry out both actions himself.

If, however, it is ascertained that the vehicle 6 is operated in the second driving mode, i.e., the highly automatic driving mode, a display is generated on the display surface 3 as shown in FIG. 4b. In the second driving mode, the vehicle 6 carries out both the vehicle guidance and the monitoring.

The first action element 9, which represents the "monitoring" action and the second action element 10 which represents the "vehicle guidance" action are, therefore, displayed with the first graphical element 7. In the present case, "with" is understood once again as adjacent to the first graphical element 7. As a result, the driver is able to detect immediately by looking at the display surface 3 that he does not have to carry out either of the two actions himself and is able to devote himself to other activities.

Figure 5A:
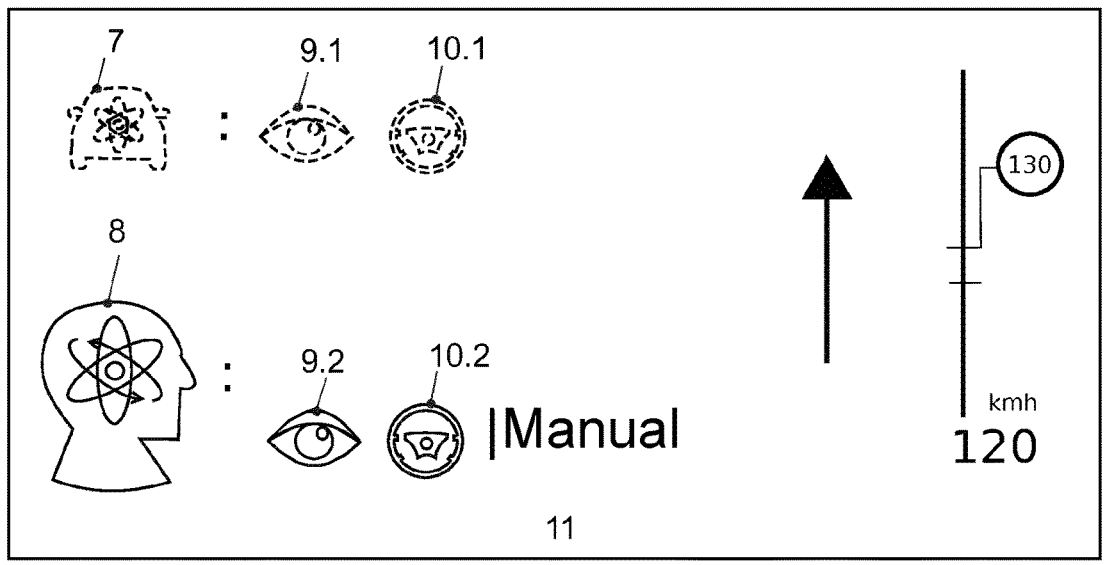
FIGS. 5a to 5c show displays as generated by a second exemplary embodiment of the method according to the invention on a display surface.
Figure 5B:
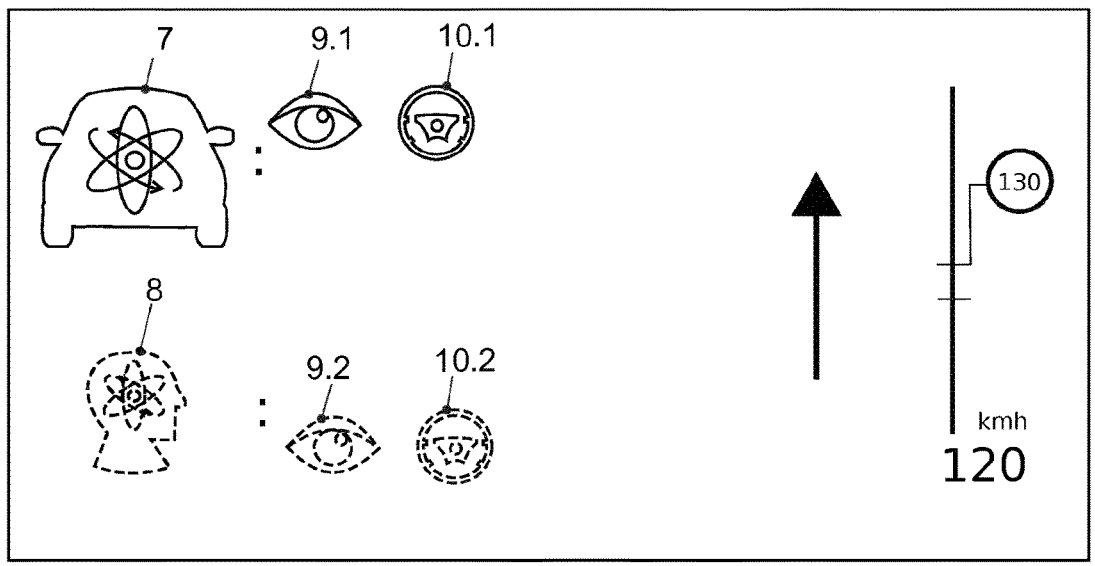
Figure 5C:
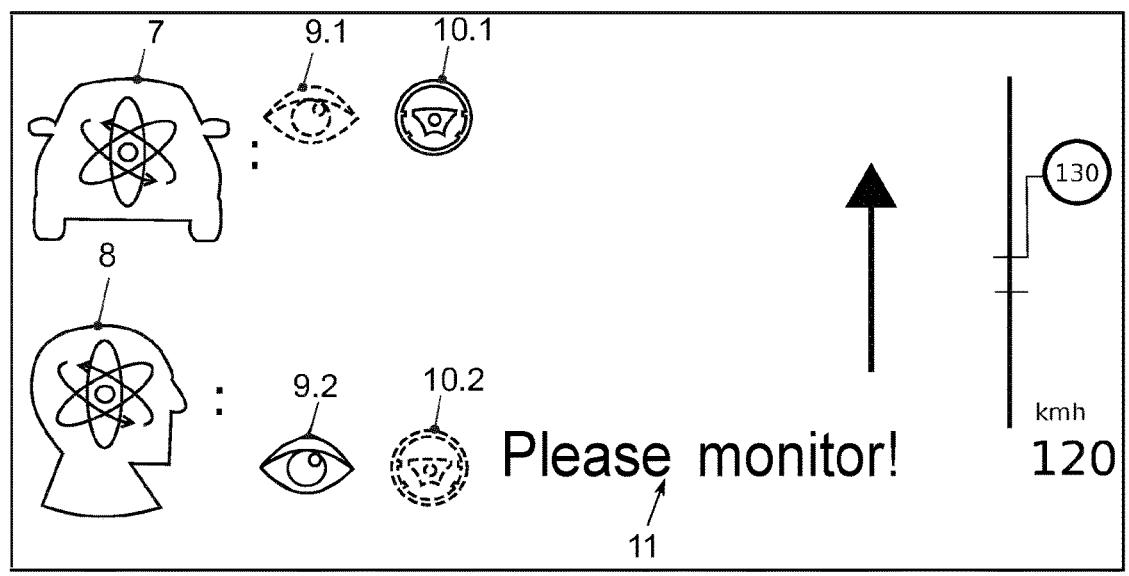

With reference to FIGS. 5a, 5b and 5c, a further exemplary embodiment of the method according to the invention is described.

The initial situation in this case is once again that the driver starts a journey.

First, the first graphical element 7 and the second graphical element 8 are generated below one another on the display surface 3. In each case, the graphical action elements 9 and 10 are displayed adjacent to the first 7 and the second graphical element 8.

In this case the graphical elements 7 and 8 and the action elements 9.1 and 10.1 and 9.2 and 10.2 are displayed as color-coded. The graphical element 7 and the action elements 9.1 and 10.1 assigned to the graphical element 7, are, for example, displayed in orange and the graphical element 8 and the action elements 9.2 and 10.2 assigned to the graphical element 8 are displayed in turquoise.

It is ascertained in which driving mode the vehicle 6 is operated. This may be preset once again or set manually by the driver at the start of a journey.

If it is ascertained that the vehicle 6 is operated in the first driving mode, i.e., the manual driving mode, a display as shown in FIG. 5a is displayed.

Here, the second graphical element 8 is displayed highlighted in comparison to the first graphical element 7. As a result, the second graphical element 8 is displayed highlighted by being displayed larger in comparison with the first graphical element 7. Additionally, the first graphical element 7 is displayed grayed-out, i.e. no longer orange but grey. This indicates to the driver that the actuator which is assigned to the second graphical element 8, i.e., the driver in the present driving mode, has to undertake an action and thus is the active actuator. The other actuator, however, is inactive.

Moreover, both graphical action elements 9.2 and 10.2, which are displayed adjacent to the second graphical element 8, are displayed highlighted in comparison to the graphical action element 9.1 and 10.1, which are displayed adjacent to the first graphical element 7. The two graphical action elements 9.2 and 10.2 are displayed highlighted, by the graphical action elements 9.1 and 10.1 being displayed grayed-out, i.e., no longer orange but gray. As a result, it is communicated to the driver which actions are the responsibility of the active actuator, i.e., in the present case the driver himself.

Additionally or alternatively, the graphical action elements 9.2 and 10.2 may also be displayed larger than the action elements 9.1 and 10.1.

Moreover, an indicator 11 is displayed adjacent to the action elements 9.2 and 10.2 which indicates to the driver that the vehicle is driven manually.

Alternatively, the first graphical element 7 and the action elements 9.1 and 10.1 assigned thereto may also be masked out.

If it is ascertained that the vehicle 6 is operated in the second driving mode, i.e., the highly automatic driving mode, a display is displayed as shown in FIG. 5b.

In this case, the first graphical element 7 is displayed highlighted in comparison to the second graphical element 8. The first graphical element 7 is displayed highlighted by being displayed larger in comparison to the second graphical element 8. Additionally, the second graphical element 8 is displayed grayed-out relative to the first graphical element 7, i.e., no longer turquoise but gray. This indicates to the driver that the actuator which is assigned to the first graphical element 7, i.e., the vehicle 6, in the present driving mode has to carry out an action and thus is the active actuator. The other actuator, however, is inactive.

Moreover, the two graphical action elements 9.1 and 10.1, which are displayed adjacent to the first graphical element 8 are displayed highlighted in comparison to the graphical action elements 9.2 and 10.2, which are displayed adjacent to the second graphical element 8. The two graphical action elements 9.1 and 10.1 are displayed highlighted by the graphical action elements 9.2 and 10.2 being shown grayed-out, i.e., no longer turquoise but gray. As a result, it is shown to the driver which actions are the responsibilities of the active actuator, i.e., in the present case the vehicle 6.

Since the driver in the case of the second driving mode does not have to carry out any action himself, no indicator is emitted.

Alternatively, the second graphical element 8 and the action elements 9.2 and 10.2 assigned thereto may be also masked out.

If it is ascertained that the vehicle 6 is operated in the third driving mode, i.e., one of the partially automatic driving modes, a display as shown in FIG. 5c is displayed.

Since in this case each of the two actuators is responsible for one of the two actions, neither of the two graphical elements 7 or 8 is displayed highlighted. As a result, it is indicated to the driver that both actuators carry out an action.

In the third driving mode, the driver undertakes the "monitoring" task and the vehicle 6 undertakes the "vehicle guidance" task.

This is displayed to the driver by the first action element 9.2 adjacent to the second graphical element 8 being displayed highlighted in comparison with the first action element 9.1. adjacent to the first graphical element 7. At the same time, the second action element 10.1 adjacent to the first graphical element 7 is displayed highlighted in comparison with the second action element 10.2 adjacent to the second graphical element 8.

The action elements 9.2 and 10.1 are in turn displayed highlighted, by the action elements 9.1 and 10.2 being displayed grayed-out, i.e., no longer orange or, respectively, turquoise but gray. Alternatively or at the same time they may also be displayed larger.

Since the driver now has to carry out the monitoring himself, an indicator 11 "please monitor" is displayed adjacent to the action elements 9.2 and 10.2. As a result, it is immediately clear to the driver which task he is responsible for.

Alternatively, the grayed-out action elements 9.1 and 10.2, i.e., the action elements which are displayed as inactive, may also be masked out.

The remaining display elements displayed in FIGS. 5*a* to 5*c* on the display surface 3 are part of a navigation function of the vehicle 6. In this case, the direction in which he has to drive is indicated to the driver.

In addition, the current speed of the vehicle 6 is displayed. Moreover, it is displayed that a change in the permitted maximum speed is imminent on the route.

Figure 6A:
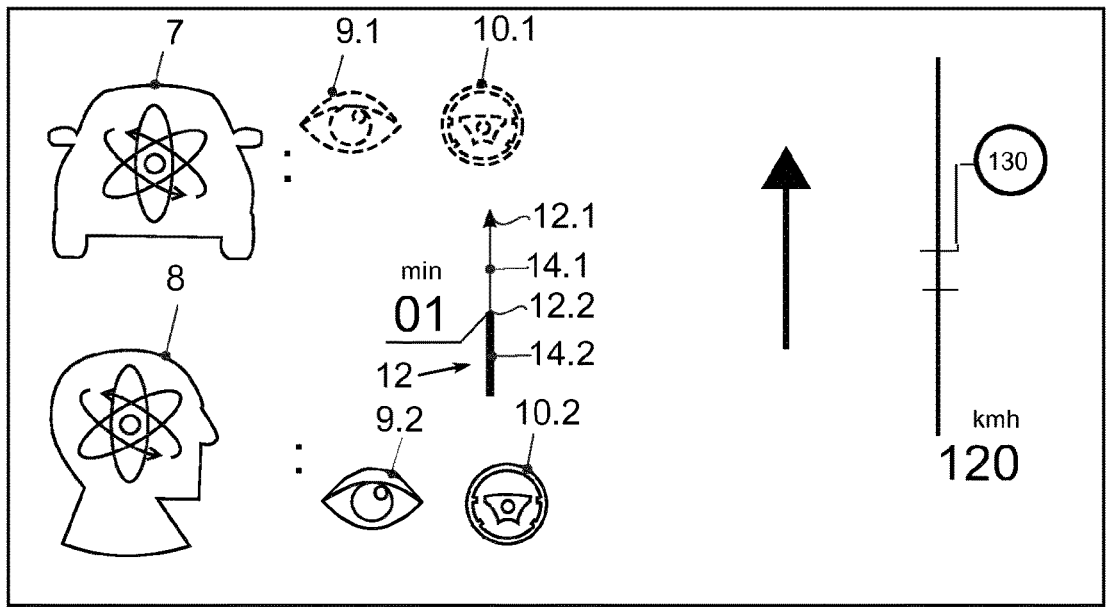
FIGS. 6a and 6b show displays as generated by a third exemplary embodiment of the method according to the invention on a display surface.
Figure 6B:
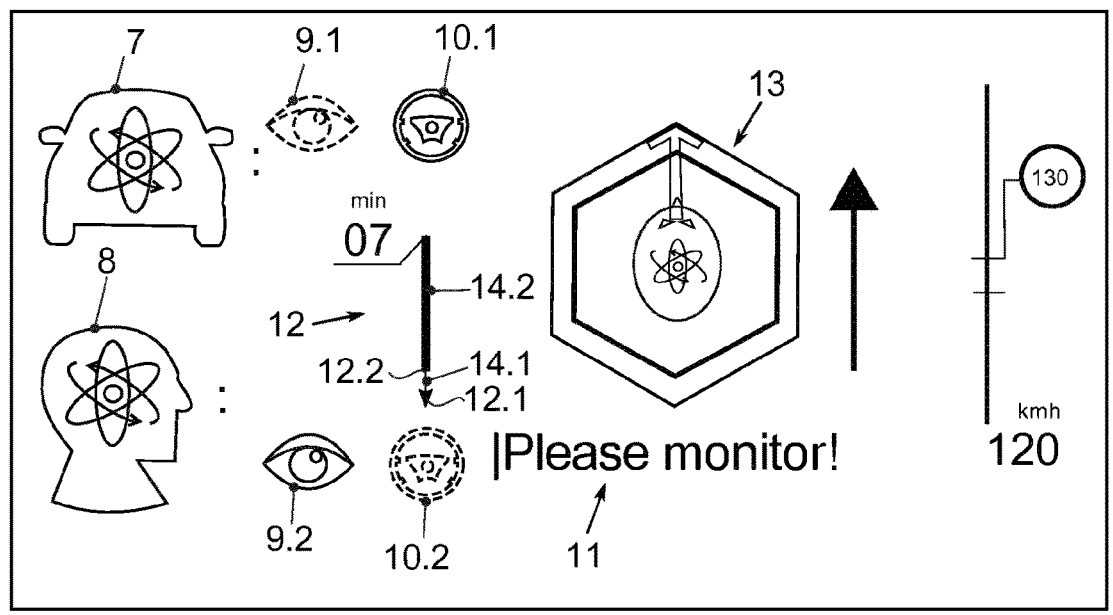

With reference to FIGS. 6*a* and 6*b*, a third exemplary embodiment of the method according to the invention is described.

The initial situation in the third exemplary embodiment is that it has been ascertained that the vehicle 6 is operated in one of the driving modes and correspondingly a display is displayed on the display surface 3.

It is then ascertained that a change in driving mode is imminent.

In the case of FIG. 6*a*, it is initially ascertained that the vehicle 6 is operated in the first driving mode and the driver therefore undertakes both the vehicle guidance and the monitoring. Therefore, the display of FIG. 5*a* is displayed as an initial display but without an indicator 11 which is only displayed as an alternative.

Then a time is ascertained after which the vehicle 6 changes from the first driving mode into the third driving mode. In this case the "vehicle guidance" action is transferred to the vehicle 6, whilst the "monitoring" action remains with the driver. In the present example, it is ascertained that this changeover is being carried out in one minute.

A direction-indicating graphical element 12 is generated between the action elements 10.1 and 10.2. The direction-indicating graphical element 12 in this case is designed as an arrow. The arrow 12 points from the action element 10.2 to the action element 10.1. As a result, it is indicated to the driver that the "vehicle guidance" action is transferred from the "driver" actuator, to whom the action element 10.2 is assigned, to the "vehicle" actuator 6, to which the action element 10.1 is assigned.

Moreover, in addition to the direction-indicating graphical element 12, the ascertained time is displayed numerically, namely 1 minute until the transfer of the action.

The arrow 12 comprises a line 12.2 and a tip 12.1. A part 14.2 of the line 12.2 is displayed highlighted in comparison with the other part 14.1 of the line 12.2. In this case the length of the part 14.2 of the line 12.2, which is displayed highlighted is dependent on the ascertained time.

The part 14.2 of the line 12.2 displayed highlighted becomes increasingly short, the shorter the remaining time. The remaining time is also displayed to the driver, therefore, adjacent to the numerical display via the removal of the highlighted part 14.2 of the line 12.2.

The highlighted part 14.2 is highlighted by the line thickness in the highlighted part 14.2 being selected to be larger than in the non-highlighted part 14.1.

Alternatively, the thicker part 14.2 of the arrow line 12.2 may also become increasingly long, the shorter the ascertained time. As a result, in the present example, the thicker part 14.2 of the arrow line 12.2 runs toward the action element 10.1.

In the example of FIG. 6*b*, it is ascertained that the vehicle is operated in the third driving mode. Additionally, it is ascertained that a change into the first driving mode is taking place after seven minutes. As a result, the task of the vehicle guidance is transferred from the vehicle 6 to the driver.

Therefore, in turn, a direction-indicating graphical element 12, once again an arrow, is displayed, which this time however points from the action element 10.1 to the action element 10.2. The time which remains until the driving mode is changed is displayed numerically adjacent to the arrow 12.

Moreover, a part 14.2 of the arrow line 12.2 is once again displayed highlighted by being displayed thicker than the non-highlighted part 14.1 of the arrow line 12.2. The length of the highlighted part 14.2 of the arrow line 12.2 is in turn dependent on the ascertained remaining time until the change of driving mode. The length of the highlighted part 14.2 of the arrow 12 is dynamically adapted to the remaining time.

Additionally, a further graphical element 13 which indicates to the driver that he currently has to carry out the "monitoring" action is shown in FIG. 6*b*.

A warning, which warns the driver of the change of driving mode may be additionally emitted on the display surface 3. As a result, the driver is not surprised that he himself now has to carry out one of the actions which he has not previously carried out.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS

1 System
2 Display device
3 Display surface
4 Control unit
5 Ascertainment unit
6 Vehicle
7 First graphical element
8 Second graphical element
9 First graphical action element
10 Second graphical action element
11 Indicator
12 Direction-indicating element; arrow
12.2 Arrow line
12.1 Arrow tip
13 Graphical element
14.2 Highlighted part of the arrow line
14.1 Non-highlighted part of the arrow line

What is claimed is:

1. A method for displaying driving modes of a vehicle, wherein the vehicle can be operated in at least two different driving modes, in which
it is determined, via an ascertaining unit, whether the vehicle is being operated in a first or a second driving mode, wherein in the first driving mode a second actuator conducts a first action and in the second driving mode a first actuator conducts the first action;
a first graphical element, which represents the first actuator and a second graphical element, which represents the second actuator are generated on a display surface, and depending on whether the vehicle is in the first or the second driving mode, a first graphical action element, which represents the first action, is generated with at least one of the first and second graphical element, wherein the first graphical action element is assigned visually to one of the two graphical elements to illustrate, which of the actuators is responsible for conducting the first action.

2. The method as claimed in claim 1, wherein at least one second action is conducted by the first or the second actuator, wherein depending on the determination as to whether the vehicle is in the first or the second driving mode, a second graphical action element, which represents the second action, is generated with the first and/or second graphical element.

3. The method as claimed in claim 1, wherein the first actuator is a system for the automatic control of the vehicle and the second actuator is a driver of the vehicle.

4. The method as claimed in claim 2, wherein the first action comprises a monitoring of the vehicle and the second action comprises a vehicle guidance of the vehicle.

5. The method as claimed in claim 2, wherein in the first driving mode, the second actuator conducts the first and the second action, in the second driving mode the first actuator conducts the first and the second action, and in a third driving mode the first actuator conducts the second action and the second actuator conducts the first action.

6. The method as claimed in claim 5, wherein in the first driving mode the vehicle is guided manually, in the second driving mode the vehicle is guided highly automatically, and in the third driving mode the vehicle is guided partially automatically.

7. The method as claimed in claim 5, wherein it is ascertained in which driving mode the vehicle is operated; if it is ascertained that the vehicle is in the first driving mode, the first and the second graphical action elements are generated with the second graphical element; if it is ascertained that the vehicle is in the second driving mode, the first and the second graphical action elements are generated with the first graphical element; and
if it is ascertained that the vehicle is in the third driving mode, the first action element is generated with the second graphical element, and the second action element is generated with the first graphical element.

8. The method as claimed in claim 5, wherein
it is ascertained in which driving mode the vehicle is in;
irrespective of which driving mode the vehicle is in, the first and the second graphical action elements are generated with the first and with the second graphical element; wherein if it is ascertained that the vehicle is in the first driving mode, the first and the second action elements are displayed highlighted with the second graphical element;
if it is ascertained that the vehicle is in the second driving mode, the first and the second action elements are displayed highlighted with the first graphical element; and
if it is ascertained that the vehicle is in the third driving mode, the first action element is displayed highlighted with the second graphical element and the second action element is displayed highlighted with the first graphical element.

9. The method as claimed in claim 5, wherein
if it is ascertained that the vehicle is in the first driving mode, the second graphical element is displayed highlighted,
if it is ascertained that the vehicle is in the second driving mode, the first graphical element is displayed highlighted; and
if it is ascertained that the vehicle is in the third driving mode, the first and the second graphical elements are displayed highlighted.

10. The method as claimed in claim 2, wherein
a time is ascertained after which the vehicle changes from the ascertained driving mode into a different driving mode, wherein the first and/or the second action is transferred from the first or second actuator to the respective other actuator;
a direction-indicating graphical element is generated, which points from the first and/or second action element with the first and/or second graphical element to the respective other first and/or second action element; and
the ascertained time is displayed with the direction-indicating element.

11. The method as claimed in claim 5, wherein in the third driving mode, an indicator is emitted, which displays which action has to be conducted by the second actuator.

12. The method as claimed in claim 5, wherein a warning is emitted before an imminent change from the second or third driving mode into the first driving mode, which indicates to the second actuator which action has to be undertaken by him.

13. The method as claimed in claim 2, wherein the first action comprises a monitoring of the vehicle.

14. The method as claimed in claim 2, wherein the second action comprises a vehicle guidance of the vehicle.

15. A system for displaying driving modes of a vehicle, wherein the vehicle is able to be operated in at least two different driving modes, comprising
an ascertainment unit, which is configured to ascertain whether the vehicle is operated in the first or the second driving mode, wherein in the first driving mode a first action may be conducted by a second actuator and in the second driving mode the first action may be conducted by a first actuator;
a display surface on which a first graphical element may be generated, which represents the first actuator, and on which a second graphical element may be generated, which represents the second actuator; and
a control unit, which is configured to generate a first graphical action element, which represents the first action with the first and/or second graphical element on the display surface, depending on the ascertainment as to whether the vehicle is in the first or the second driving mode, wherein the first graphical action element is assigned visually to one of the two graphical elements to illustrate, which of the actuators is responsible for conducting the first action.

16. The system as claimed in claim 15, wherein the display surface is arranged in the windshield of the vehicle.

17. A vehicle having a system as claimed in claim 15.

18. A vehicle having a system as claimed in claim 16.

* * * * *